United States Patent [19]

Bynum

[11] Patent Number: 5,362,110

[45] Date of Patent: * Nov. 8, 1994

[54] FLUID COUPLING AND FASTENER CAPTURE DEVICE

[75] Inventor: Kurt K. Bynum, Saline, Mich.

[73] Assignee: Moeller Manufacturing Co., Inc., Wixom, Mich.

[*] Notice: The portion of the term of this patent subsequent to Jan. 28, 2009 has been disclaimed.

[21] Appl. No.: 826,005

[22] Filed: Jan. 27, 1992

Related U.S. Application Data

[63] Continuation-in-part of Ser. No. 660,645, Feb. 25, 1991, Pat. No. 5,083,819.

[51] Int. Cl.⁵ ............................................. F16L 55/00
[52] U.S. Cl. ............................... 285/87; 285/92; 285/315; 285/319; 411/121; 411/221; 411/326
[58] Field of Search ................... 285/87, 89, 92, 315, 285/319; 411/119, 120, 121, 941.1, 7, 951, 221, 227, 326, 949, 950

[56] References Cited

U.S. PATENT DOCUMENTS

| | | | |
|---|---|---|---|
| 1,043,683 | 11/1912 | Fieser | 285/319 X |
| 1,103,212 | 7/1914 | Kraemer | 285/319 X |
| 1,168,613 | 1/1916 | Eberly | 411/951 X |
| 1,302,105 | 4/1919 | Warren | 411/951 X |
| 2,784,987 | 3/1957 | Corcoran | 285/82 |
| 3,885,851 | 5/1975 | Bennett | 285/319 X |
| 4,383,787 | 5/1983 | Reynolds | 411/221 |
| 4,423,992 | 1/1984 | Ankeny | 411/221 X |
| 4,684,284 | 8/1987 | Bradley, Sr. | 411/221 X |
| 4,786,536 | 11/1988 | Kaempen | 285/319 X |
| 4,796,856 | 1/1989 | Munini | 285/315 X |
| 4,860,838 | 8/1989 | Asak | 285/319 |
| 4,944,536 | 7/1990 | Bartholomew | 285/319 |
| 5,058,930 | 10/1991 | Schlosser | 285/319 X |
| 5,083,819 | 1/1992 | Bynum | 285/92 X |
| 5,116,088 | 5/1992 | Bird | 285/319 |
| 5,215,336 | 6/1993 | Worthing | 285/319 |

*Primary Examiner*—Randolph A. Reese
*Assistant Examiner*—Heather Chun Shackelford
*Attorney, Agent, or Firm*—James M. Deimen

[57] ABSTRACT

A new capture device comprising a plurality of axially extending tangs on one of a pair of complementary fittings in a fluid coupling and a polygonal circumferential groove on the other fitting adapted to engage the tangs. Upon rotational engagement of the fittings the tangs engage the polygonal groove and "ratchet" about the junctures between the flats until the coupling is tight. Although not limited to particular materials, the new capture device is particularly suited to very tough, strong and hard materials such as titanium, stainless steel and Inconel alloy because the effectiveness of the capture device is dependent upon the stiffness of the tangs. The new device prevents vibrational disassembly of the complementary fittings without preventing disassembly solely with wrenches. Moreover, the complementary fittings and capture device can be repeatedly assembled and disassembled without any damage to the threads or capture device. A variety of configurations of the capture device are illustrated and applications to a bolt and nut and a hole plug (e.g. turbine engine borescope port) are disclosed.

19 Claims, 5 Drawing Sheets

FLUID COUPLING AND FASTENER CAPTURE DEVICE

This is a continuation-in-part of copending application serial number 07/660,645, filed on Feb. 25, 1991, now U.S. Pat. No. 5,083,819 issued Jan. 28, 1992.

BACKGROUND OF THE INVENTION

The field of the invention pertains to fluid tubing couplers and fasteners and, in particular, to fasteners for hydraulic, pneumatic and fuel systems on aircraft wherein unusual and perhaps "exotic" materials are used for weight savings and corrosion resistance. Such fittings are subject to severe vibration and absolutely must not loosen or disassemble during use. As a result military and civilian specifications require assurance that failure will not occur. Conventional construction now requires that the fittings be "wired" and the wires "sealed" to prevent the fasteners front rotating apart during use.

An early patent, U.S. Pat. No. 315,895, discloses a device to retain a packing nut on a valve. The device engages the flats on the nut and is retained by a small screw. U.S. Pat. No. 1,691,851 and more recently U.S. Pat. No. 4,801,160 each disclose a circumferential coil spring having means at one end of the coil spring to engage a ratchet or socket in the member that is to be prevented from rotating.

U.S. Pat. No. 3,343,852 discloses a ball detent device to lock a nut on an electrical connector. The ball detent engages a plurality of grooves in an inside member. U.S. Pat. No. 3,986,731 discloses a tangentially extending external pawl that engages notches in the exterior of the inside member whereas U.S. Pat. No. 3,069, 187 discloses an axially extending pawl adapted to engage a plurality of ratchet grooves in the radial face of the other member. Similarly, U.S. Pat. Nos. 2,489,919, 2,731,058 and 4,150,845 all disclose devices that engage ratchet grooves in a radial face on one of the members. U.S. Pat. No. 2,992,018 discloses a circumferential plurality of axial grooves on an inner member and a circumferential plurality of axial grooves on the inside of a nut as axially extended. Splits in the axially extended portion of the nut permit the grooved portion to flexibly expand and ratchet about the inner member.

Most of the devices disclosed above are bulky and complicated with several separate parts or require a complicated geometry be formed on one or both of the members retained to prevent retrograde movement and inadvertent disassembly. Such complications are to be avoided with aircraft couplings and fasteners which are typically formed from expensive, hard, tough and strong metals and alloys. Other common devices rely upon plastic yielding of the threads joining the couplers or fasteners or plastic yielding of a plastic insert. Plastic yielding destroys the reuseability of such capture devices after one or a few disassemblies. With a view toward creating a light, compact and simple capture device that can be retrofitted to existing couplings, applicant has developed the new capture device disclosed below.

SUMMARY OF THE INVENTION

The new capture device for fluid fittings and couplings comprises an inside threaded or female fitting formed with an external plurality of flats about the circumference and an outside threaded or male fitting fitted with an external circumferential ring having a plurality of axially parallel tangs adapted to engage the plurality of flats.

The plurality of flats on the female fitting are radially spaced from the axis of the female fitting a distance less than the external radius of the outside of the female fitting between the flats and the engageable end of the female fitting thereby forming a circumferential shoulder adjacent the circumferential plurality of flats.

The male fitting plurality of tangs are spaced radially from the external threads. The tang ring is fitted against a flange on the male fitting. The ring may be one piece and press fit onto a shoulder of greater radius than the external threads or, in particular for retro-fit combinations, the ring is split to fit into an existing thread relief groove in the male fitting. In the retro-fit construction a retaining ring or sleeve is press fit over the split ring. A groove or shoulder is formed in the one piece ring or the sleeve for purposes of disassembly if necessary.

In the particular application for which this capture device was developed, severe vibration and temperatures to about 1000° F. are typically and normally encountered. The new capture device does not engage the threads on the fittings and does not rely on any plastic yielding. Rather, the flexing of the tangs is well within the yield strength of the material. Testing of the capture device shows no degradation of the threads on the fittings, the functional engagement surfaces of the capture device or the flexing tangs over hundreds of cycles of assembly and disassembly of the fittings.

The engagement or disengagement of the fittings and capture device requires no additional tools beyond the two wrenches for the fittings. Relative motion between the wrenches is all that is necessary. The torque required to activate the capture device is significantly less than the specified torque for seating the fully engaged complementary fittings. Thus, a false full torque does not occur. The torsional resistance of the capture device is sufficient to prevent vibrational loosening and thermal cycling loosening of the fittings. Moreover, the shoulder acts as a fail safe check against any disassembly of the fittings so long as at least one tang remains unbroken. This capability is very important in aircraft applications. Moreover, in aircraft applications preferably the number of tangs equals the number of flats.

Although described above in terms of a specific male and female complementary coupling pair, the male and female fittings may be reversed relative to the capture device with the circumferential polygonal flats and shoulder formed on the male fitting and the tangs on the female fitting. Nor is the capture device limited only to the threaded coupling pair disclosed below but the device is also applicable to other types of fittings and fasteners that include relative rotational motion to fully engage. A borescope plug and a bolt and nut are disclosed as examples.

As illustrations of alternative configurations the external plurality of flats may be modified into concave scallops, ratchets, or a circumferential cone for example. The engagement tips of the tangs may also be configured for the particular shape of the external "flats" or for off-center engagement.

DESCRIPTION OF THE PREFERRED EMBODIMENTS

Figure 1:
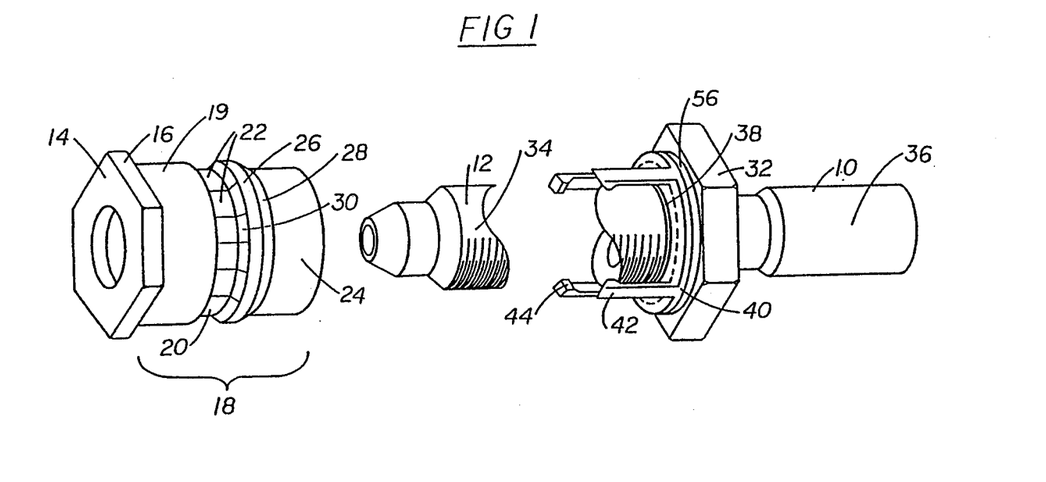
FIG. 1 is an exploded view of the capture device on modified complementary fluid fittings.

Illustrated in FIG. 1 is an exploded view of a fluid coupling comprising a coupling fitting 10 having a threaded male portion 12 and a coupling fitting or a nut with an internally threaded female portion 14. The fitting 10 and nut 14 are permanently attached to lengths of tubing (not shown) in a conventional manner that allows the nut to be rotated relative to the fitting and relative to the tubing entering the nut. Thus, the nut 14 can be screwed on and off the fitting 10.

The nut 14 includes a hexagonal portion 16 for attachment of a wrench and a generally cylindrical portion 18 within which are the internal threads (not shown). Intermediate the length of the cylindrical portion 18 is a circumferential groove 20 or depressed portion formed with a plurality of flats 22 to create a polygonal surface in the groove 20 about the nut. Between the inner end 24 of the nut 14 and the groove 20 is a shoulder 26 having a sloping or bevelled surface 28 facing the inner end 24 and a second bevelled but also flatted surface 30 facing and forming a part of the groove 20. The inner end 24 of the cylindrical portion 18 is of smaller diameter than the portion 19 adjacent the hexagonal portion 16. Although the nut 14 may be formed of other materials for other purposes, the particular application for which the improvements disclosed herein apply require a very hard, tough and strong material such as titanium. As an alternative, to retro-fit an existing nut of relatively soft material, a separate collar or sleeve incorporating the polygonal surface 20 and adjacent bevelled shoulder 30 and made of suitable hard, tough, strong material may be press fit over a smooth generally cylindrical portion corresponding to 18.

Figure 3:
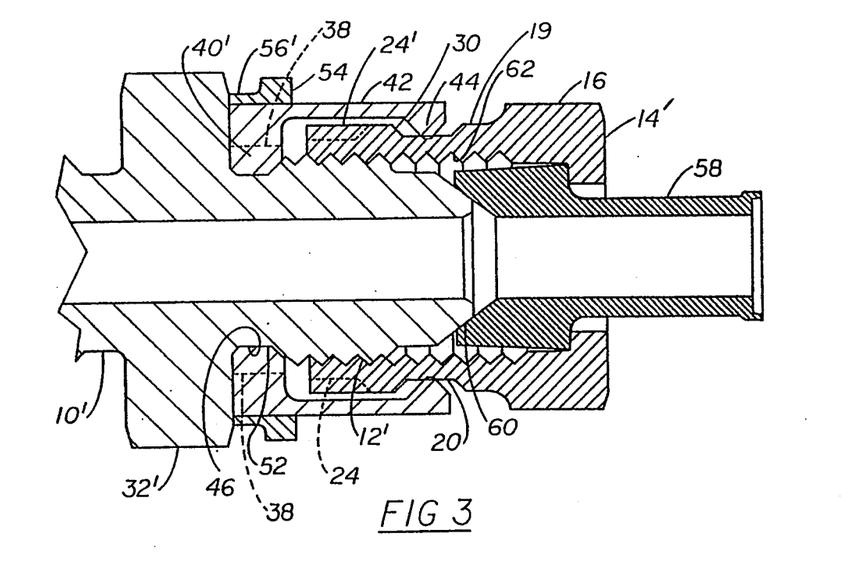
FIG. 3 is a side cross-section of the capture device retro-fitted to the complementary fluid fittings.

In a similar manner the fitting 10 may be formed of other materials for other purposes, but here the particular application requires very hard, tough and strong material such as Inconel alloy, a product of Inco, Inc. (The International Nickel Company). The fitting 10 includes a hexagonal portion 32 for attachment of a wrench with generally cylindrical portions 34 and 36 extending axially to either side of the hexagonal portion 32. The cylindrical portion 34 includes the threaded male portion 12 and a cylindrical shoulder 38 between the threaded portion and the hexagonal portion 32. (Also shown in FIG. 3 is the location of the cylindrical shoulder 38).

Press fit circumferentially about the cylindrical shoulder 38 is a ring 40 having a plurality of axially extending tangs 42 integrally attached to the ring. Each tang 42 is formed with a radially inward directed knob 44. As is more fully disclosed and explained below the knobs 44 on the ends of the tangs 42 are adapted to engage the polygonal groove flats 22 on the nut 14 when the nut 14 and fitting 10 are engaged tightly. On relatively small fittings and capture devices the flats 22 may be slightly concave to emphasize the junctures between the flats and provide better capture of the knobs 44.

Figure 2:
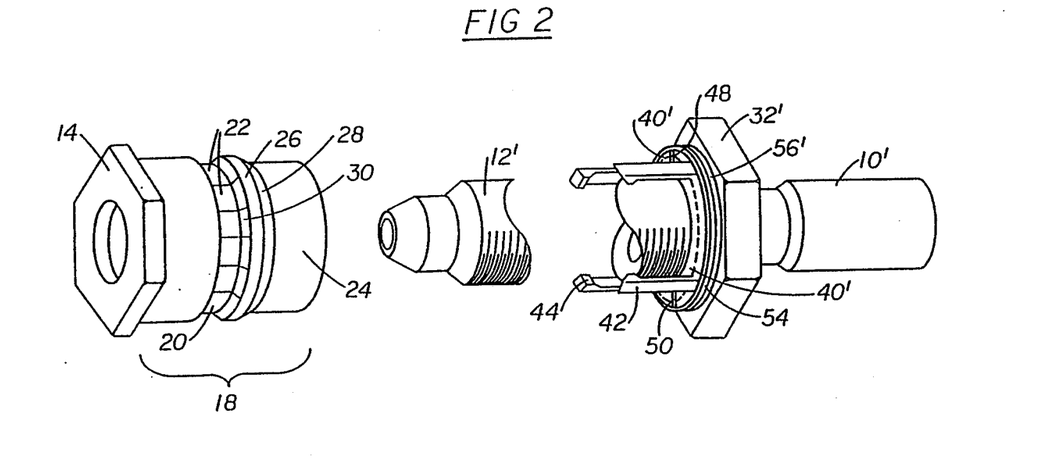
FIG. 2 is an exploded view of the capture device retro-fitted to complementary fluid fittings.

In FIG. 2 the nut 14 remains substantially the same as in FIG. 1, however, the capture device is modified to permit retrofit to Inconel fittings 10' currently in use. Referring also to FIG. 3, the fitting 10' includes a relief groove 46 between the hexagonal portion 32' and the threaded portion 12'. To retrofit attach the capture device to the fitting 10', the ring 40' is split at 48 and 50 and modified to fit down into the relief groove 46 as shown at 52. A circumferential retaining ring or sleeve 54 is press fit over the ring 40' to retain the ring halves in tight engagement with the relief groove 46. As above a plurality of tangs 42 extend axially from the ring 40' and are formed with radially inwardly directed knobs 44.

To assist in the removal of the capture device when necessary, a circumferential groove 56' is formed in the exterior of the sleeve 54. In a similar manner an exterior circumferential groove 56 is formed in the ring 40 shown in FIG. 1.

As best shown in FIG. 3 the nut 14' engages a tubing ferrule 58 which in turn is tightly engaged to the fitting 10' at a conical juncture 60 in a conventional manner. The inner end 24' of the nut 14' in FIG. 3 is of the same diameter as the portion 19 and therefore the shoulder 26 and bevel 28 do not separately appear as in FIGS. 1 and 2. The bevel flats 30, however, are formed in the sidewall of the groove 20.

In tightening the nut 14' and ferrule 58 to the fitting 10' the male 12' and female 62 threads are rotatably engaged. As the nut 14' is engaged to the fitting body 10' as best shown in FIG. 3 the tang knobs 44 engage the inner end 24' of the nut 14' flexing outwardly the tangs 42. In the case of the smaller diameter inner end 24 the nut threads engage the fitting threads 12 prior to engagement of the tang knobs 44 with the bevelled surface 28 and flexing over the shoulder 26. The tangs 42 again flex as the knobs 44 engage and pass over the circumferential bevel 30. The tang knobs 44 drop into the polygonal groove 20 and engage the flats 22 as the nut 14' is finally tightened. The tang knobs 44 engage the flats 22 with an interference fit and therefore, as the nut 14' is rotated, the tangs 42 flex and the knobs 44 "ratchet" over the junctures between the flats 22. As disclosed below the flats 22 may be modified in form such as concave scalloped.

Figure 4A:
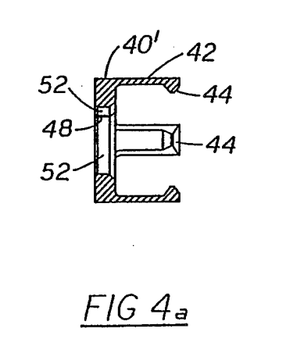
FIGS. 4a and 4b illustrate the separate tang ring of the capture device with FIG. 4a taken along the line 4a—a in FIG. 4b.
Figure 4B:
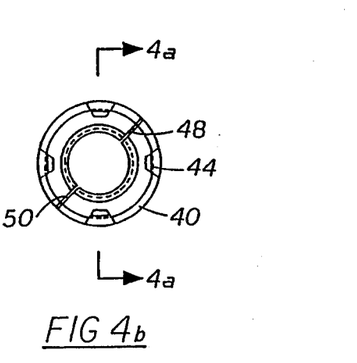
Figure 5A:
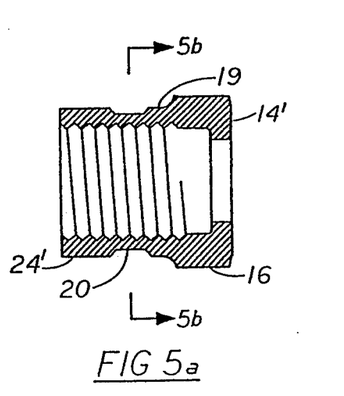
FIGS. 5a and 5b illustrate the nut fitting modified for the capture device with FIG. 5a taken along the line 5a—5a in FIG. 5b and vice versa.
Figure 5B:
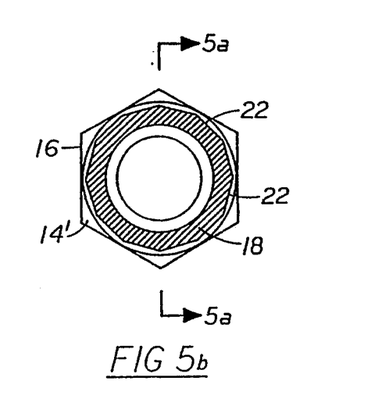

In FIGS. 4a and 4b the capture device split ring 40' and tangs 42 are illustrated separate from the fitting 10 or 10'. In keeping with the titanium nut and Inconel fitting above the split ring 40' and tangs 42 are titanium. In a prototype for test the dimension across the flats of the hexagons 16 and 32 is about three-quarters of an inch and the cylindrical portion 18 of the nut 14 is slightly more than one-half inch in diameter. The interference fit between the tang knobs 44 and the polygonal groove flats 22 is 0.02 inches. The interference fit between the sleeve 54 and the split ring is 0.002 inches. Nevertheless with the high hardness and modulus of elasticity of each of the materials in combination with the configuration of the capture device, the capture device effectively prevents loosening of the nut. In the prototype twelve flats 22 are provided as best shown in FIGS. 5a and 5b wherein the nut 14' is shown separate from the fitting 10 or 10'.

The capture device as above described is made of titanium, however, the tangs and nut fitting need not both be of the same material. Rather, the materials should be compatible for the operating conditions. In particular, the shoulder and groove flats on the nut fitting should be very hard and the tangs very stiff and tough for their size to resist any yielding or permanent set which would reduce the effectiveness of the capture device.

Figure 6:
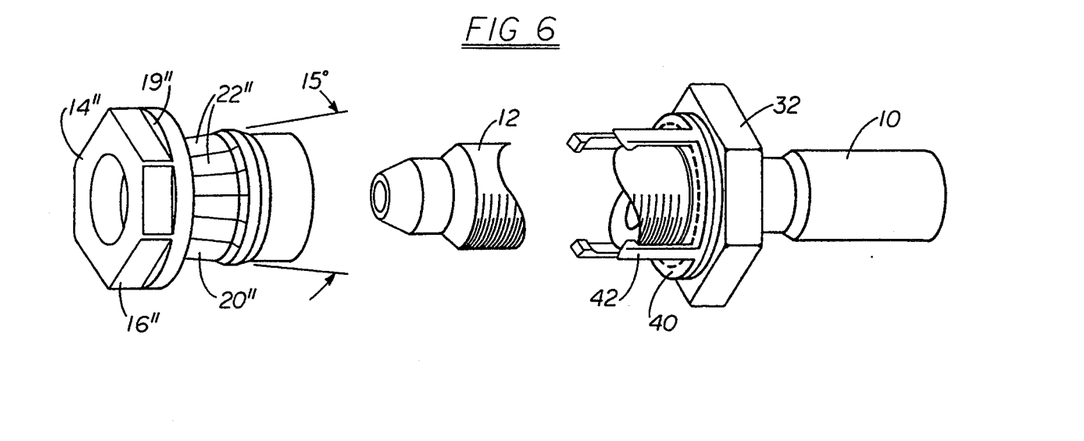
FIG. 6 illustrates modifications to the tangs and polygonal flats of the capture device of FIG. 1.

FIG. 6 illustrates further modifications to the nut 14 of FIG. 1. The nut 14" includes a flange 19" located between the hexagonal portion 16' and the circumferential depressed groove 20". The flange 19" as shown is the same as or larger in diameter than the maximum point to point diameter of the hexagonal portion 16". The flange 19" prevents slippage of a wrench from the hexagonal portion 16" into the groove 20".

FIG. 6 also illustrates a modified groove 20". The modification comprises a truncated "conical" surface for the bottom of the groove 20" with the flats 22" the surface of the cone. As shown the cone is approximately 15°.

Figure 7A:
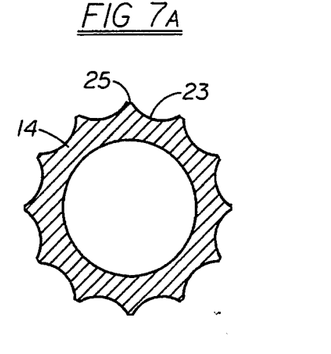
FIGS. 7a, 7b and 7c illustrate schematically alternate concave scallop, ratchet and double scallop forms of the polygonal flats respectively.
Figure 7B:
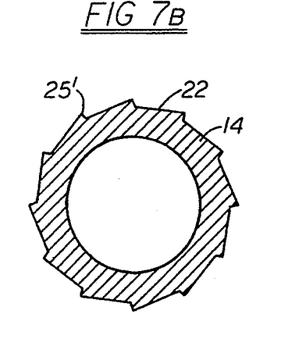
Figure 7C:
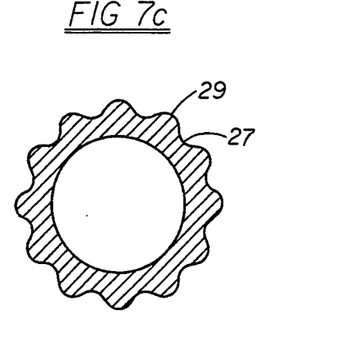

FIG. 7 illustrates optional configurations to the circumferential flats 22 in the depressed groove 20. In FIG. 7a the polygonal shape is scalloped to form concave surfaces 23 about the bottom of the groove 20. The junctures 25 between the scallops 23 provide a more pronounced ratcheting effect between the knobs 44 and the junctures 25 whether the nut 14 is turned clockwise or counter-clockwise. In FIG. 7b, however, the groove bottom retains the polygonal flats 22 but with a one-way ratchet configuration at the junctures 25'. For most applications the configuration shown in FIG. 7c is preferred. The FIG. 7c shape comprises alternating concave 27 and convex 29 smoothly joined scallops. The smoothly joined scallops are formed of substantially semi-cylindrical surfaces and provide a ratcheting effect in either direction.

Figure 8A:
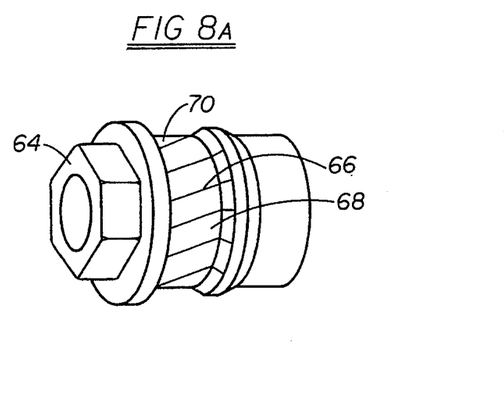
FIGS. 8a and 8b illustrate two additional modifications of the polygonal flats.

FIG. 8a illustrates a nut 64 modified to provide a preferential turning direction but nevertheless permitting the nut to turn in either direction. As shown the junctures 66 between the flats 68 are biased relative to the axis of the nut 64 thereby providing a twist to the placement of the flats about the groove 70. Depending on the bias relative to the thread direction of the nut, the engagement of the tangs with the flats 68 will cause the torque required to turn the nut in one direction to differ from the torque required to turn the nut in the other direction.

Figure 8B:
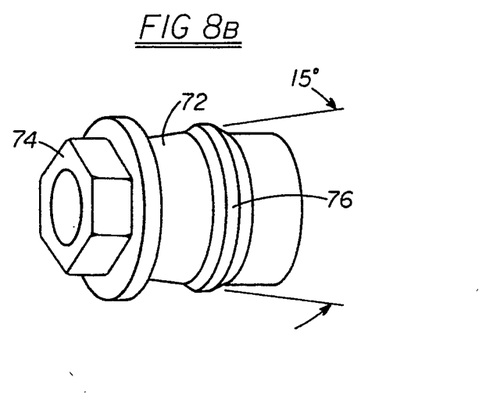

In FIG. 8b the groove 72 of the nut 74 is conical and smooth without junctures. The cone is about 15° as indicated. The tangs engage the conical surface 72 without a ratcheting effect, however, the shoulder 76 is retained together with the conical surface and provides resistance to disassembly. Thus, the nut 74 is applicable to less rigorous assemblies, however, by eliminating the flats, the nut is less expensive to manufacture.

Figure 9:
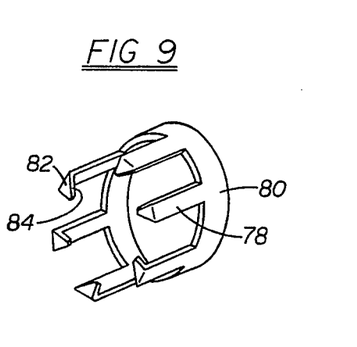
FIG. 9 illustrates modified tips on the tangs to provide relatively increased resistance to removal.

FIG. 9 illustrates a modified tang assembly comprising six tangs 78 extending from a ring 80. The knobs 82 at the ends of the tangs 78 may be formed as in FIG. 1 or as shown in FIG. 9 wherein the knobs are asymmetric 84 to the tangs. The asymmetric knobs 82 provide a preferred direction for the ratcheting. Although four and six tang rings are illustrated above, most applications utilize substantially more tangs, such as ten to twenty. However, for purposes of clarity lesser numbers of tangs are shown.

Figure 10:
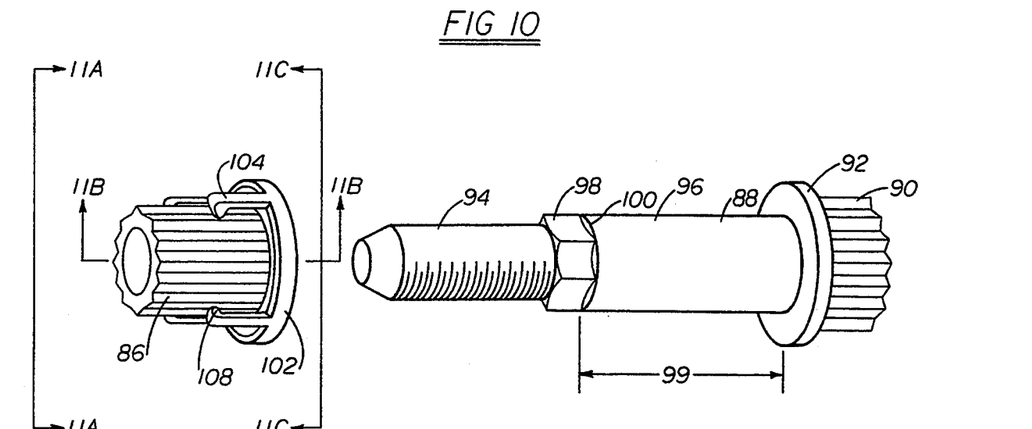
FIG. 10 is an exploded view of an alternate bolt form of the capture device with the tangs mounted on a twelve point nut.

FIG. 10 illustrates a free spinning nut 86 and bolt 88 combination. The bolt head 90 and nut 86 have a twelve point exterior configuration common on aircraft engines. The head 90 includes an integral flange 92. Between the threaded portion 94 and the shank 96 is a circumferential band comprising a plurality of concave scallops 98. The working length 99 of the bolt 88 is slightly greater than the distance between the flange 92 and the inner edge 100 of the scallop band 98.

Figure 11A:
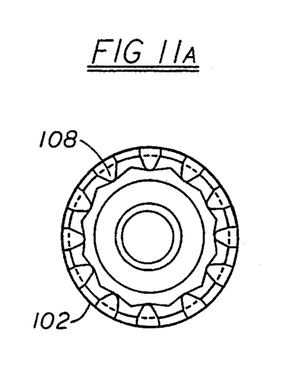
FIGS. 11a, 11b and 11c are views taken in the directions 11a—11a, 11b—11b and 11c—11c respectively in FIG. 10.
Figure 11B:
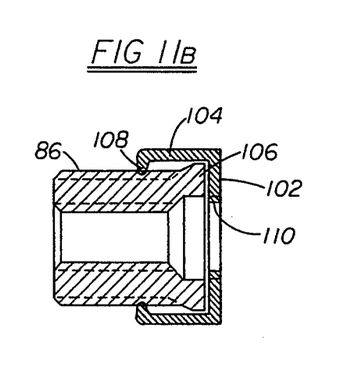
Figure 11C:
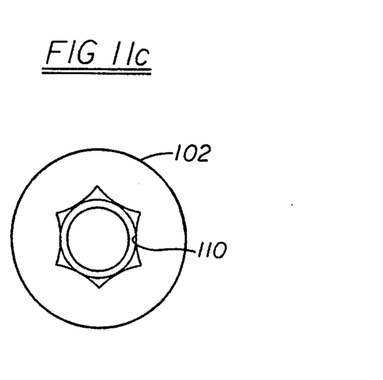

As is also shown in FIGS. 11a, 11b and 11c the nut 86 includes a ring 102 having a plurality of tangs 104 extending parallel to the axis of the nut. The tangs 104 extend over a shoulder 106 integral with the nut 86. Knobs 108 formed on the ends of the tangs 104 after assembly to the nut 86 engage the twelve point exterior of the nut for the ratcheting effect. Although only four tangs and knobs are shown, as many as twelve may be used as illustrated in FIG. 11a. As best shown in FIG. 11c the ring 102 has a scalloped bore 110 complementary to the band 98. The scalloped bore 110 is sufficiently large to clear the outside diameter of the threads 94 of the bolt 88. Normally the outside diameter of the band 98 is equal or less than the diameter of the shank 96.

In use the ring 102 and tangs 104 free spin with the nut 86 on the threads 94. Upon engagement of the complementary scallops 110 and 98 the ring and tangs are prevented from rotation with the nut 86. The ratchet effect between the knobs 108 and the twelve point surface on the nut permits the nut 86 to be turned only with sufficient torque to overcome the ratchet effect. Thus, the nut 86 can only be fully tightened or loosened with wrenches and inadvertent loosening absent tools cannot occur. Since the flexing of the tangs 104 is kept well within the elastic limit of the material and preferably within the fatigue limit of the material the nut and bolt combination can be assembled and disassembled a large number of times without degradation because the capture device is not degraded by the flexing of the tangs. Rather, failure eventually results from frictional wear at the contact of the tang knobs with the junctures between the flats or concave scallops. Thus, suitable means of hardening the knobs and the polygonal surface are applicable. Such treatments might be diffusion treatments, plating or hard surfacing. For aircraft applications, the bolt, nut and capture device are expected to be titanium, Inconel or similar strong and hard materials that are also very wear resistant. The device is, however, not limited to such materials.

Figure 12:
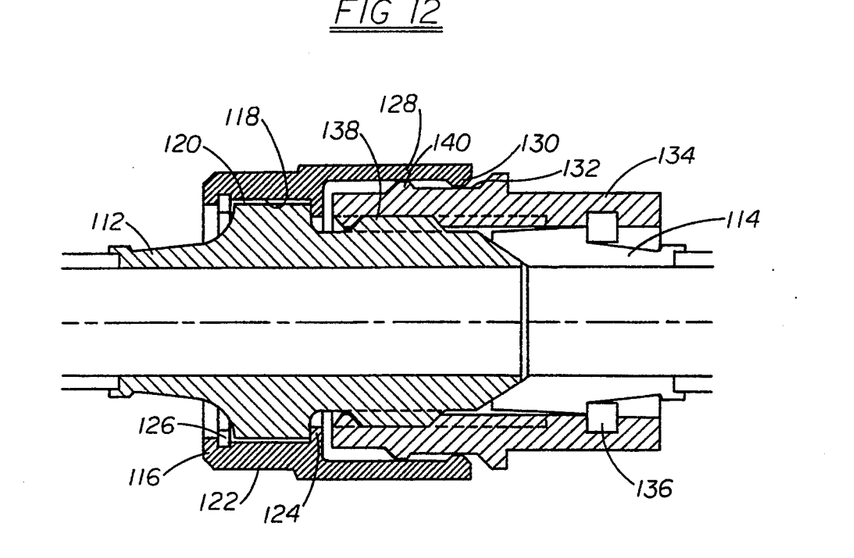
FIG. 12 illustrates schematically a retro-fit in-line fluid coupling with the new capture device.

FIG. 12 illustrates a retro-fit in-line fluid fitting replacement. The conventional coupling 112 and ferrule 114 are retained and the original nut removed. The locking ring 116 has an internal bore 118 complementary to the hexagonal exterior 120 of the coupling 112. The exterior 122 of the locking ring 116 is likewise hexagonal. The locking ring 116 is axially positioned by an interior shoulder 124 and a retaining ring 126. A plurality of tangs 128 extend axially from the locking ring 116 and include knobs 130 adapted to engage a plurality of flats 132 on the nut 134. The retro-fit nut 134 is slipped over the ferrule 114 and retained by a square or round thrust wire 136. Coupling and tightening the threaded engagement 138 causes the knobs 130 to first engage and pass over the shoulder 140 with attendant flexing of the tangs 128. The knobs 130 then engage the flats 132 and with further rotation of the nut 134 the seal is made at 142. As above with wrenches the locking ring 116 and nut 134 can be assembled and disassembled a large number of times without degradation, however, the device cannot inadvertently loosen absent tools.

Figure 13:
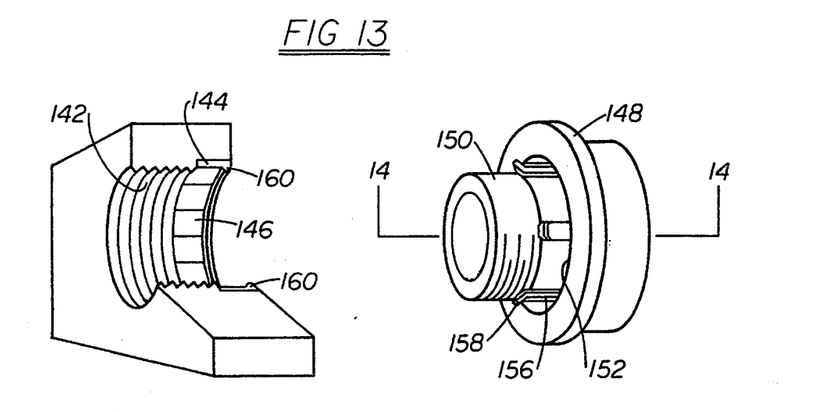
FIG. 13 illustrates in exploded view a self-locking hole plug wherein the scalloped polygonal surface comprises an internal circumference and the tangs flex radially inward.
Figure 14:
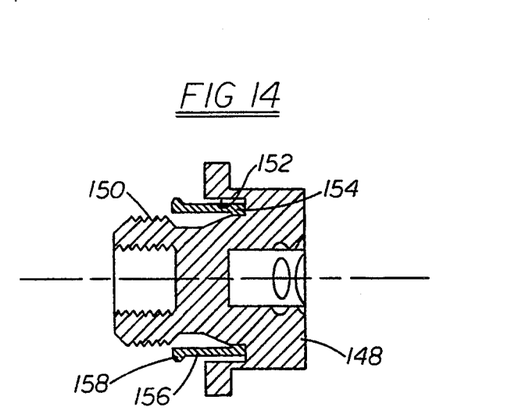
FIG. 14 illustrates in cross-section the attachment of the tangs to the hole plug.

Illustrated in FIGS. 13 and 14 is a self-locking borescope plug employing the capture device. In this embodiment the borescope socket 142 is counterbored and fitted with a hard ring 144. The ring 144 is formed with internal scallops or flats 146. The borescope plug 148 includes a threaded portion 150 for engagement with the threaded socket 142. The plug 148 is formed with annular depression 152 into which is inserted a non-rotatable ring 154 having a plurality of tangs 156. As distinguished from the embodiments above the knobs 158 extend radially outwardly from the tangs 156. As the plug 148 is engaged with the socket 142 the tangs 156 flex radially inwardly as the knobs 158 engage the shoulder 160 on the hard ring 144. With further engagement the knobs 158 engage the scallops 146 to thereby prevent inadvertent rotation absent tools. The hard ring 144 may be press fit, staked or otherwise fastened permanently to the socket 142. The tang ring 154 may also be suitably fastened permanently in the depression 152 by press fit, staking or other permanent means. As an alternative, the annular depression 152 may be replaced by a plurality of individual holes in a circular pattern. In each hole a tang is staked or press fit.

In particular for some retrofit applications, the hard ring 144 may be installed in or formed in a "key type" threaded insert which is in turn installed in the socket 142. Thus, for such applications the plug 148 may be installed by implementing an installation procedure similar to currently established thread repair procedures.

As a further alternative, a tang ring may be press fit into the counterbore in the socket and a complementary hard ring with the shoulder and concave scallops press fit to the plug. As is clear from the above disclosures for particular applications the knobs on the tangs may face inwardly or outwardly, the polygonal or scalloped surface may face inwardly or outwardly and either the female or male member may have the tangs or engaging surface.

I claim:

1. A capture device comprising a plurality of tangs extending from a portion of a first fitting, said tangs radially spaced from the axis of the first fitting and non-rotatable about the first fitting, surfaces non-rotatably circumferentially encircling a second fitting, the second fitting have means adapted to rotatably engage the first fitting, a circumferential shoulder adjacent the circumferential surfaces, means on each tang spaced from the first fitting, said means on each tang radially positioned to contact the circumferential shoulder and adapted to tightly engage the circumferential surfaces whereby engagement of the first and second fittings causes the tangs to flex as the means on each tang pass over the circumferential shoulder adjacent the circumferential surfaces and subsequently to flex back into tight engagement with the circumferential surfaces and disengagement of the first and second fittings causes the tangs to flex in the same manner as the engagement.

2. The capture device of claim 1 wherein the circumferential surfaces form a conical shape having a radius decreasing with increasing axial engagement of the fittings and the tangs.

3. The capture device of claim 2 wherein the circumferential surfaces comprise a plurality of flats formed in the conical shape.

4. The capture device of claim 1 wherein the circumferential surfaces comprise a plurality of flats, the junctures therebetween being biased to the axis of the fitting.

5. The capture device of claim 1 wherein the circumferential surfaces comprise a plurality of concave scallops in cross-section.

6. The capture device of claim 1 wherein the circumferential surfaces comprise a plurality of flats, the junctures therebetween formed to provide a ratchet surface about the circumference.

7. The capture device of claim 1 wherein the circumferential surfaces comprise a plurality of alternating concave and convex substantially scallop shaped surfaces about the circumference.

8. The capture device of claim 1 wherein the means on each tang to contact the circumferential shoulder and the surfaces are offset from a radial plane through defined by the axis of the capture device and the radial center of each tang.

9. The capture device of claim 1 wherein the first fitting includes separate means in non-rotatable engagement with a coupling and means to axially retain the first fitting to the coupling, and wherein the second fitting includes means to engage and axially retain a ferrule thereto, whereby the first fitting can be axially moved into engagement with the coupling and the second fitting can be axially moved into engagement with the ferrule to effect a retro-fit installation of the capture device to an open ferrule-coupling.

10. The capture device of claim 9 wherein the means to engage and retain the second fitting to the ferrule permit relative rotation therebetween.

11. The capture device of claim 1 including at least one tool engaging surface on the second fitting and a circumferential flange between the circumferential surfaces and the tool engaging surface.

12. The capture device of claim 1 wherein the circumferential surfaces and the circumferential shoulder comprise an internal annulus having the shoulder adjacent thereto and the tang means for engagement therewith extend radially outward from the tangs.

13. The capture device of claim 12 wherein the internal annulus and shoulder comprise a hardened ring adapted to fit in a counterbore.

14. The capture device of claim 12 wherein the first fitting comprises a plug.

15. A capture device for a threaded fastener comprising a bolt and nut, the capture device comprising an annular ring having a plurality of tangs extending therefrom and radially spaced from the axis of the ring, means on each tang spaced from the ring and adapted to engage a non-cylindrical circumferential surface of the nut, in the engagement said ring and tangs rotatable relative to the nut, means on a bolt at the juncture between the shank and thread and complementary means on the ring adapted to engage and prevent rotation of the ring and tangs relative to the bolt upon sufficient engagement of the nut to the bolt, thereby causing the means on each tang to ratchet over the non-cylindrical surface of the nut.

16. The capture device of claim 15 wherein the means on the bolt at the juncture between the shank and thread comprises a circumferential band of concave scallops and the complementary means comprises an axial borehole in the ring having convex scallops.

17. The capture device of claim 15 wherein the nut includes a circumferential shoulder positioned adjacent the ring and within the tangs upon assembly together.

18. The capture device of claim 17 wherein the engagement means on the tangs prevents disassembly of the tang ring and nut.

19. The method to retro-fit a coupling and ferrule having a ferrule nut with a capture device having a first fitting and a second fitting, the first fitting including means to non-rotatably engage the coupling and means to axially retain the first fitting to the coupling and including a plurality of axially extending tangs and the second fitting including means to engage and axially retain a ferrule thereto and having a mating circumferential surface for engagement with the tangs comprising the steps of:

disassembling the coupling from the ferrule, removing the ferrule nut from the ferrule and discarding the ferrule nut, sliding the first fitting over the coupling and installing the axial retention means to the first fitting such that the first fitting is axially retained on the coupling, sliding the second fitting which replaces the ferrule nut over the ferrule and installing the axial ferrule retention means to the second fitting such that the second fitting is axially retained on the ferrule, and rotatably engaging the second fitting to the coupling to drive the ferrule into sealing engagement with the coupling and engage the tangs with the circumferential surface.

* * * * *